United States Patent [19]

Sutton

[11] Patent Number: 5,056,260
[45] Date of Patent: Oct. 15, 1991

[54] APPARATUS FOR ACCELERATING THE GROWTH RATE OF AGRONOMIC AND HORTICULTURE PLANT VARIETIES

[76] Inventor: David K. Sutton, Box 308, Catoosa, Okla. 74015

[21] Appl. No.: 440,370
[22] Filed: Nov. 22, 1989
[51] Int. Cl.⁵ .............................................. A01G 9/14
[52] U.S. Cl. .......................................... 47/59; 47/58; 47/69; 47/DIG. 12
[58] Field of Search ....................... 47/17, DIG. 12, 58, 47/69, 1.01, 59

[56] References Cited

U.S. PATENT DOCUMENTS

| | | | |
|---|---|---|---|
| 3,703,051 | 11/1972 | Weinberger | 47/17 |
| 4,041,641 | 8/1977 | Dietz | 47/65 |
| 4,065,875 | 1/1978 | Srna | 47/17 |
| 4,077,158 | 3/1978 | England | 47/17 |
| 4,754,571 | 7/1988 | Reichmann | 47/69 |
| 4,817,332 | 4/1989 | Ikeda | 47/17 |
| 4,930,253 | 6/1990 | Todd | 47/65 |

FOREIGN PATENT DOCUMENTS

| | | | |
|---|---|---|---|
| 964460 | 3/1975 | Canada | 47/DIG. 12 |
| 153217 | 8/1985 | European Pat. Off. | 47/65 |
| 8100385 | 8/1982 | Netherlands | 47/69 |
| 969208 | 11/1982 | U.S.S.R. | 47/65 |
| 1042671 | 9/1983 | U.S.S.R. | 47/DIG. 12 |
| 1440379 | 11/1988 | U.S.S.R. | 47/DIG. 12 |

OTHER PUBLICATIONS

"Rock Around the Garden", Science News, Jul. 15, 1972.
"Sounding Off on Plants", Washington Daily News, Jul. 8, 1970.
"The Use of Ultrasonic Energy in Agriculture", Agricultural Engineering, May 1949.

Primary Examiner—Henry E. Raduazo
Attorney, Agent, or Firm—James C. Nemmers

[57] ABSTRACT

Vibration-causing-motion in combination with semihydroponics is used to accelerate plant growth at a faster rate than other current systems. The system of the invention utilizes a frequency of 45 to 500 cycles per second, and includes the use of weights to produce the necessary amplitude for the desired vibration. The system of the invention also may utilize a timing device which cycles on and off throughout the day, every day, to apply the desired amount of motion to the plants over a given period of time. The semihydroponics employed utilizes layers of soil, air and water combined at times with moving water and isolation of the plant roots in soil to minimize root rot.

10 Claims, 4 Drawing Sheets

APPARATUS FOR ACCELERATING THE GROWTH RATE OF AGRONOMIC AND HORTICULTURE PLANT VARIETIES

BACKGROUND OF THE INVENTION

By the year 2010, is it predicated that the world's population will double to a total of 8 billion people. If the predication becomes true, the world's ecosystems will become seriously strained. Therefore, methods by which man can improve crop growth are desperately needed. The green revolution represents one example of man's attempt to fulfill this need, but the green revolution has inherent weaknesses in that the processes used weaken the natural survival capabilities of the plants. An alternative method of increasing plant growth without the inherent weaknesses of the green revolution is the process of aeration. However, the use of this process requires continuous special treatment, such as the application of tons of fertilizer and massive use of pesticides, or the high yield strains will produce only small amounts of food compared to native strains.

Another method of increasing plant growth, which is similar to exercising the human body, can also provide increased rates of plant growth by using hydroponics and vibration, but such systems have not been developed for extensive commercial applications.

The feasibility of growing plants in greenhouses, homes, and apartments has always existed, but the rate of production in such facilities has not been such sufficiently high to encourage researchers to develop such production for commercial purposes. However, existing systems of growing plants in such facilities suggest the feasibility of raising plants in a confined environment for commercial purposes, but no one has developed appropriate methods or systems for accomplishing this goal.

There is also a need for improved ways of producing superior growth with fewer problems than using straight hydroponics and high vibration frequencies, for higher frequencies do not slightly move, shake or agitate the plant structures, and thus do not treat the plants on a holistic basis.

There is furthermore a critical need for improved methods for accelerating plant growth and for developing techniques and equipment for carrying out these improved methods in all available facilities and under conditions not normally viewed as favorable for commercial production.

SUMMARY OF THE INVENTION

The methods of the invention each use a weighted object moving in a low frequency range to apply a slight moving or shaking motion to the plants at timed intervals in combination with a semi-hydroponic system. All of the methods will increase productivity of both agronomic and horticultural varieties. The invention includes three methods using combinations of vibration and motion, semi-hydroponics, and aqua-vibraponics. One method, called the subterranean hydroponic method, utilizes soil, a plastic plate with many small holes, dead air space and lava rock, and a water flow system using either a water pump or using the air from the air pump to rise against a slanted floor, therby pushing the water to the area of least resistance, and causing the water to circulate.

The second method, called the sublevel hydroponic method, utilizes two plastic plates with many small holes, one to hold the plants rigid and one to separate the lava rock from the dead air space. There is also an embodiment which only requires one plastic plate for separation between the dead air space and the outside air which is used for the common type of household plants in order to enhance their appearance and their growth rate. In this system the plants are left in their original pots and placed into an environment created using the principles of the invention and later removed and returned to a more decorative pot for use in the decor of the home or office.

The third semi-hydroponic method utilizes one of the first two methods in combination with vibration and with aquatic animals in a three-tiered stairstep design tank with three waterfalls. Unlike other methods, this method does not aerate the soil, the soil only serving as a medium to hold the plants rigid, provide the proper support for the stimulus, and to help protect the plant against bacterial buildup by providing the natural soil-borne microorganisms. The soil also helps to maintain a balanced ph within the system. The dead air space provides a means of protection for the base of the plant root system because it does not come in direct contact with the water, thus cutting down on root rot, bacterial and fungal buildup, and helping to maintain proper ph in the entire system. The dead air space also allows for some moisture and for constituents of the air, such as oxygen and nitrogen and other nutrients to reach the roots. Other roots are allowed to grow down into the water flow system naturally and obtain concentrations of air, mainly oxygen and nitrogen, and nutrients. This method helps keep the ph of the water more balanced. In this aqua-vibraponic system, the aquatic animals supply waste products which can be used as nutrients for the plants. Depending on the combination of plants and aquatic animals, they can feed off one another and thus create a closed system.

In each of the methods, the growing containers preferably are made of black material to prevent light from reaching the roots; if clear plastic containers are used, they require more maintenance and closer scrutiny of the plants as they grow.

DETAILED DESCRIPTION OF THE PREFERRED EMBODIMENTS OF THE INVENTION

Figure 1:
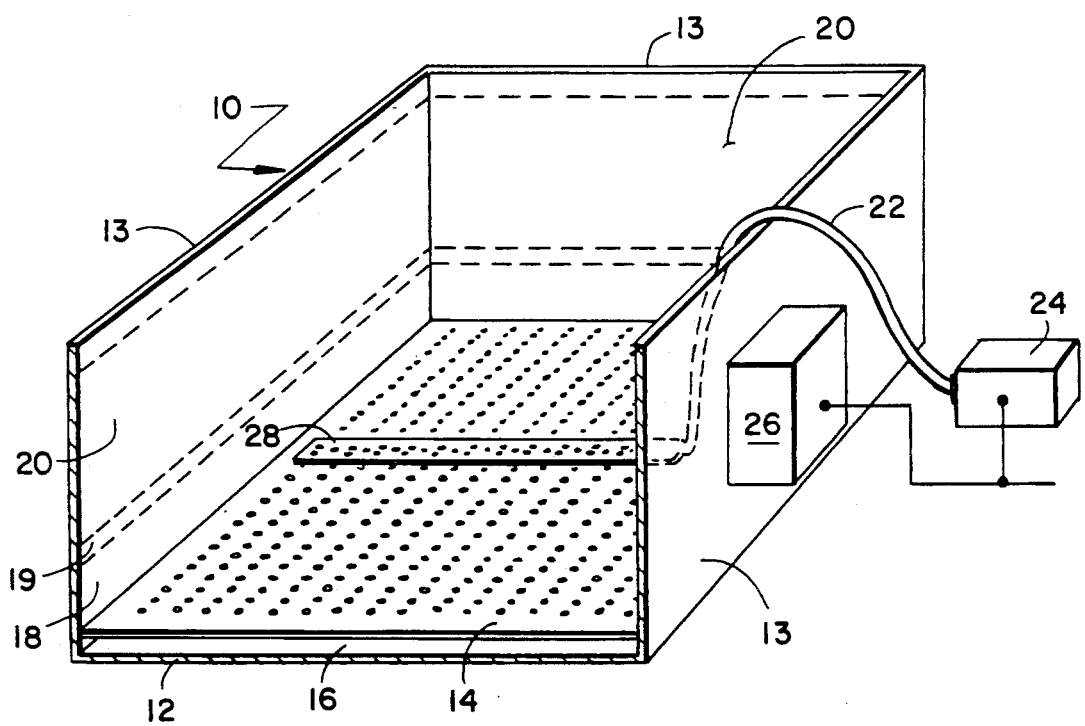
FIG. 1 is a perspective view, partly cut-away, illustrating a basic system employing the principles of the invention.

In FIG. 1, there is illustrated a pan 10 having a bottom 12 and sidewalls 13 to form a water-tight container. Supported just above bottom 12 is a perforated floor 14 that creates an air space 16 between floor 14 and bottom 12. A layer 18 of gravel, such as lava rock, is placed on top of the floor 14, and and on top of layer 14 is a dead air space 19 covered by a layer of soil 20. Water will fill the spaces beneath the soil layer 20. Air is supplied to the air space 16 through a supply hose 22 that is connected to an air pump 24. If desired, the air hose 22 contains a plurality of openings in that portion 23 of the hose 22 that travels across the air space 16, as illustrated in FIG. 1. A vibrator 26 is mounted on one of the sidewalls 13 to produce the desired vibration effects on seeds and plants growing in the soil layer 20.

Figure 2:
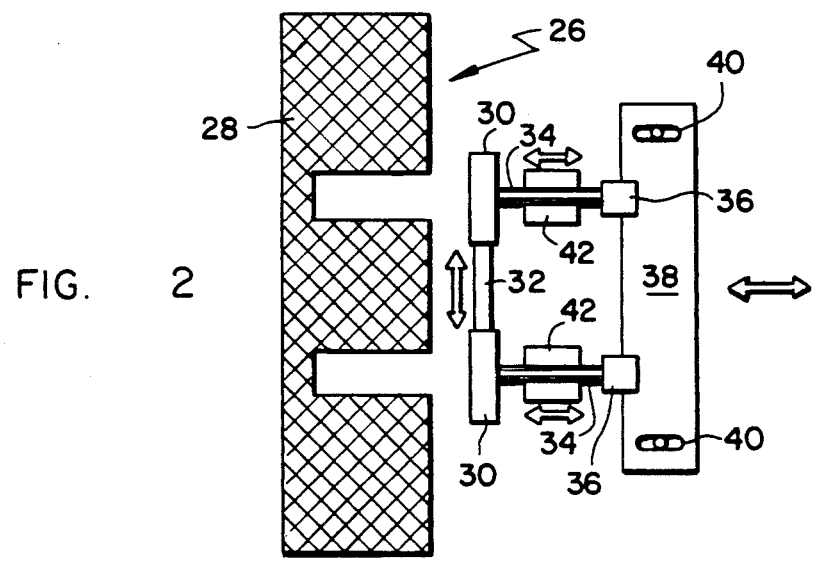
FIG. 2 is an elevational view showing a typical vibrating unit used in practicing the principles of the invention.

This vibraponic system utilizes a vibrator 26 of any suitable type capable of producing a frequency range anywhere between 45 cycles per second and 500 cycles per second, and vibrator 26 may be controlled by a timer (not shown) for on and off intervals, when used in combination with a sublevel hydroponic system of the type described hereinafter. As shown in FIG. 2, vibrator 26 includes an electromagnet 28 supplied by alternating current from any suitable source so as to produce reciprocating motion in a permanent magnets 30 that are connected by a resilient material such as rubber 32. Each of the magnets 30 has an arm 34 connected by rubber connectors 36 to a metal plate 38 that is mounted on the sidewall 13 of the container 10. Plate is preferably adustable by the use of slots 40 to allow the pitch intensity to be controlled. Weights 42 are adjustably and slidably mounted on arms 34 to also control the pitch intensity.

Figure 3:
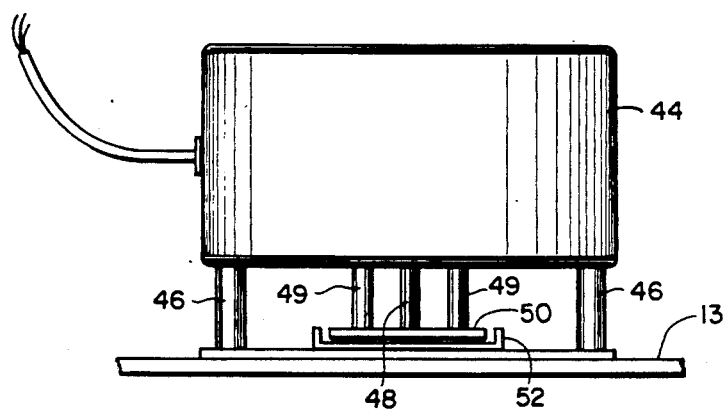
FIG. 3 is an elevational view of a vibrating motor.

FIG. 3. illustrates a motor 44, either AC or DC, that can be used to produce the desired vibration. Motor 44 is mounted to the sidewall 13 of the container 10 on resilient mounts 46, and motor 44 drives a shaft 48 that is eccentrically mounted on rubber mounts 49 to a driven plate 50 seated in a circular seat 52 secured to the sidewall 13 of container 10. The position of shaft 48 relative to the seat 52 may be adjustable to vary the pitch intensity of the vibration produced.

The frequency range produced by vibrator 26 uses energy waves to move plant structures and aid in dissolving nutrients in the water, and it will impart energy waves that indeed move all plant structures, exercising them, if you will. This vibration is more of motion (shaking) and is used to break up nutrient material for better root uptake to move the leaves in a motion that creates air currents low enough but just fast enough for optimum gas exchange between the air and leaf structures, stretching and/or moving plant structures to aid in better circulation of fluids within the plants. The stretching and movement of plant structures causes friction which is converted into heat to some degree, and this heat also aids in increasing the metabolic rate of the plants. Therefore the plant structures are being treated on a holistic basis.

The form of vibration used in the invention will outgrow any hydroponic system or outgrow any system of higher type frequency ranges, for the higher frequency ranges do not move the entire plant structures. All it does at higher ranges is to impart a frequency that only acts to increase the metabolic rate period. The higher ranges are transformed into heat only, and do not move the entire plant structures, therefore not treating the plants on a holistic basis. If you understand the stretching and tearing down of muscle fibers in humans during work and exercising, you will understand how my system functions. During the "on" phase (which is very critical as to the duration of stimulus), the tissues of leaf and stem structures are somewhat stretched and torn, so that during the "off" phase, the plant structures have time to rebuild damaged tissues and add additional tissues for strength. It has been found that this is true in that not only the frequency, but the weights used for this type of vibration of motion (shaking) on a timed basis are extremely important to maximize a fast growth rate.

In the invention the preferred vibration frequency is 60 cycles per second and up to 120 cycles per second only, but the weight of the vibrating parts of the vibrating unit 26, not the containter it is attached to, is a very integral part of making this unit produce the best possible results. The proper frequency and correct weight of the vibrating parts are combined to achieve mechanical motion, pitch, or energy waves on a timed basis which actually accelerates rapid plant growth. This vibration is preferably applied for a maximum of 15 minutes and then off for 45 minutes and must cycle throughout the day and every day to achieve the desired results. If the vibrating unit runs more than 15 minutes the plants become stressed and will die, and if the plants are not stimulated enough, there are no noticeable results.

Figure 4:
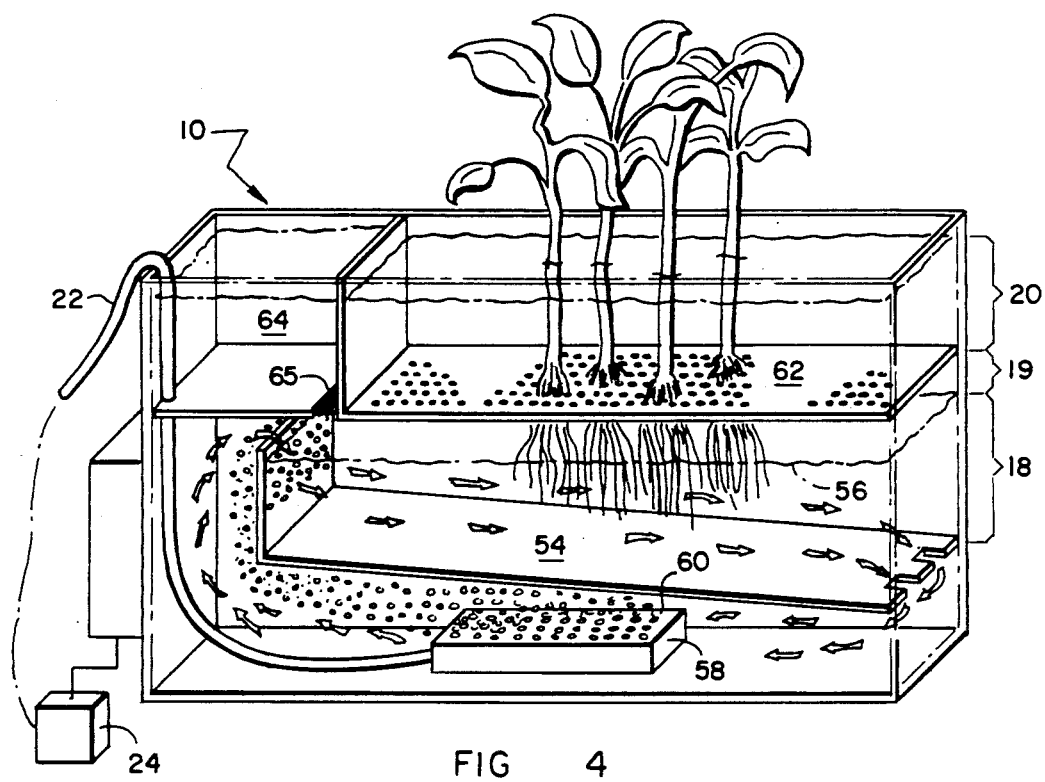
FIG. 4 is a perspective view showing another embodiment of the invention.
Figure 5:
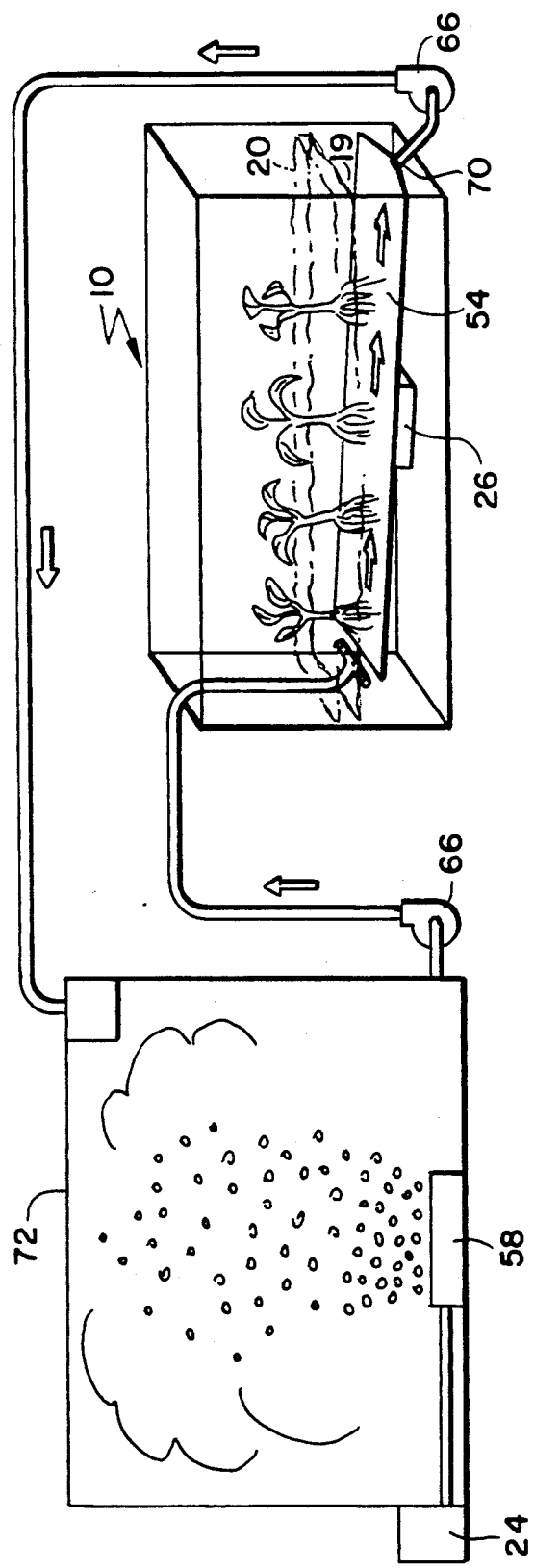
FIG. 5 is an illustration of yet another embodiment of the invention.

FIGS. 4 and 5 illustrate variations on the basic system of FIG. 1. In the systems of FIGS. 4 and 5, water flow at the bottom of container 10 is controlled by an inclined partition 54 beneath the water level 56 so that the water will flow in the direction of the arrows. The water is circulated by movement of the air from air pump 24 which discharges the air through an enclosure 58 containing a plurality of openings in its top surface 60. The lava rock layer 18 is above the partition 54 and dead air space 19 is above the rock layer 18. The soil layer 20 is separated from the lower layers by a partition 62 containing a plurality of openings that allows the roots of the plants to descend into the water. A compartment 64 to one side of the soil layer 20 may contain rock or air and provides for the addition of water to the container through a screen 65 at the bottom of compartment 64, which also allows for release of air pressure. The system illustrated in FIG. 5 is similar to that of FIG. 4 except that a water pumps 66 are used to circulate the water and return it from drain 70 in container 10 to a tank 72 into which the air pump 24 supplies air through enclosure 58. If desired, the embodiment of FIG. 5 allows the introduction of nutrients into tank 72 which will be circulated into container 10 by water pump 66. Also, in the embodiment of FIG. 5, the vibrator 26 is mounted directly to the partition 54 rather than one of the exterior walls of container 10.

The sublevel hydroponic systems of the invention utilize an air pump which produces more air in relation to the size of the growing unit or tank and also more than the living systems can use. In these systems, the air pump is not used to produce nor has any connection with eliciting vibration of motion to the plant structures. However, it could, if possible, impart the air and some type of mechanism of weight. The air pump is used to totally saturate the water with an abundance of air. In the embodiment of FIG. 4, the air is also used to push or force the water to circulate in a circular manner inside the growing unit to prevent stagnation, aid in dissolving nutrients, and evenly aerate the water medium within the unit for more efficient root uptake. Each of the vibration and subhydroponic systems separately enhance a faster than normal growth rate, but in combination they create an even greater growth rate.

The sublevel hydroponic and subterranean hydroponic systems are systems which are not directly open to the outside air and not directly in contact with the base of the plant structures. The root systems are allowed to grow down to the aerated water; however, there is a separation. The air space provides a means of providing some protection to the plants and aids in holding the plants rigid so the vibration can stimulate properly. Note, however, that there are two system designs that do allow for the base of the plants to come into contact with the aerated water directly. The protection to some degree (air space) is that it cuts down on root rot, cuts down damage due to bacteria, and helps to maintain to some degree the ph of the growing medium.

In straight hydroponic systems there are a lot of inherent weaknesses such as fungus, bacterial buildup, and ph fluctuations which cause root rot and toxins there by killing the plants, whereas with the designs of the invention, there is less maintenance problems than with straight hydroponics. However, these units are not maintenance free—they do require maintenance. The units require maintenanoe every 5 to 7 days and a maximum of 10 days. The water should be changed, and if not should be sterilized and have the ph balanced. Liguid chlorine bleach should be used at the time of water change to get rid of the bacteria and cut down on fungus buildup.

However, bleach should be used only once per month. During the water changing process, to cut down on the expense of water bills, the water itself can be reused, but only after sterilizing it first. The two best ways are to either use a ultraviolet light or chlorine bleach, the latter using a fungicide. After the use of bleach, the water should be allowed to sit for one week. Then add a declorinator fluid to the water in sufficient amounts to balance the ph. After this is done, the water should stand overnight and be rechecked for ph the following day. In using either method, the ph should always be balanced before reintroducing the water back into the system.

As stated earlier, straight hydroponics (soilless) culture has its disadvantages as well as its advantages if all obstacles are overcome. The disadvantages lie in the cost of the equipment and serious plant losses due to infections for lack of soil's wide range of micro-organisms that can act to suppress soilborne pathogens. Management problems are a disadvantage as well, having to monitor the balance of nutrients and ph all the time. There would be an advantage in areas where there is a lack of good soil or where diseases aren't controllable. Another advantage would be the increase in the growth rate of plants over the normal growing season. The methods of the invention have been termed a "semi-hydroponic" system, or a "sublevel" or "subterranean" hydroponics system. These methods utilizes good soil, plastic plate with holes, lava rock, and water flow system with aeration. Using soil in the system allows for soil-borne micro-organisms, a means to hold plants upright, and to somewhat help maintain a balanced nutrient-ph level. The plastic plate with several holes acts as a barrier between the soil and lava rock thus reducing blockage of the waterflow system by the soil. The aerated water circulates from the bottom of the container up and through the lava rock and down again. This circular motion allows for even aeration and nutrient distribution. The water flow rate is such that it is not moving too fast, thus allowing for good root uptake.

In the systems just described, the water circulation process is for the basic semi-hydroponic system which utilizes the air bubbles coming from an air supply source against a slanted floor to push the water around (See FIG. 4). In some of the designs, a water pump is used to circulate the aerated water throughout the system. (See FIG. 5).

Figure 6:
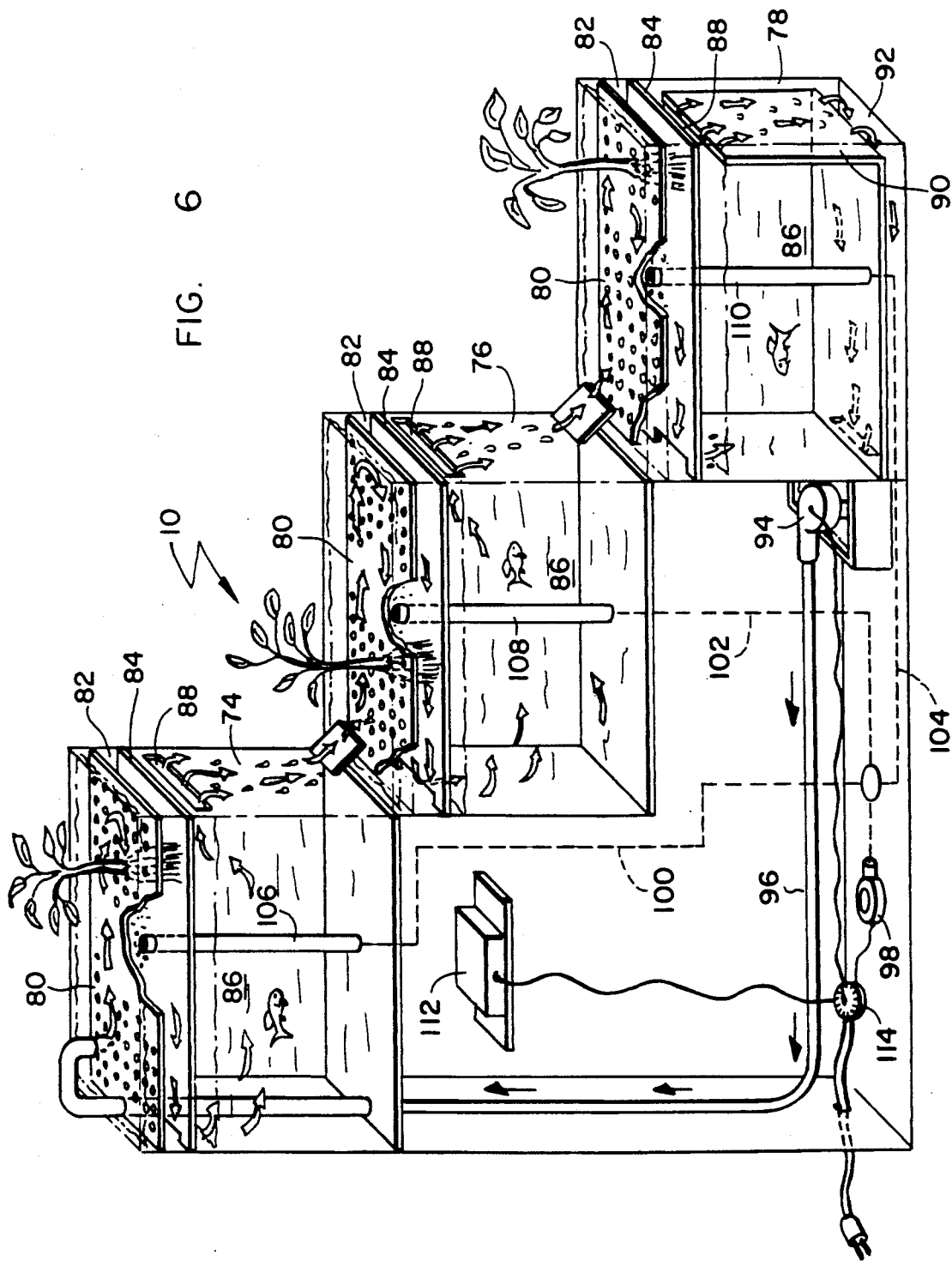
FIG. 6 is an illustration of still another embodiment of the invention.

Referring now to the unit illustrated in FIG. 6, this system utilizes the special vibration of motion, the semi-hydroponic system, aquatic animals such as fish, three waterfalls, water pump, water filters with charcoal, temperature monitor and growing units for the plants (removable for cleaning, etc.). In this system, the container 10 has three separate, substantially identical, enclosed comparments 74, 76 and 78 arranged in a stair-step fashion as shown in FIG. 6. Each compartment 74, 76 and 78 has a top 80 containing a plurality of openings, or in the alternative a layer of soil. Beneath top 80 is a lava rock layer 82 resting on a solid floor 84 that separates the rock layer 82 from the water compartment 86. At the upper end of one side of each compartment 74, 76 and 78 is an outlet 88 which allows the water to flow from the water compartment 86 into the next one of the comparments 74, 76 or 78. Water discharged from compartment 78 is collected in collector 90 formed by a second wall 92 and is recirculated by water pump 94 through line 96 back to the uppermost compartment 74. Air is circulated into the water compartment 86 of each of the compartments 74, 76 and 78 by pump 98 through air lines 100, 102 and 104 from where the air is discharged through air tubes 106, 108 and 110. A single vibrator 112 and timer 114 provide the desired vibration intensity as in the previous embodiments.

This three-in-one unit also utilizes aquatic animals for looks plus the waste products they produce will provide plant food, and depending on what kind of plants being grown, the plants can provide food for the aquatic animals. A closed system, if you will, for both can enhance one another and even cut down on maintenance of the system as well.

Following are several uses of the systems of the invention:

1. Can be used to start plants earlier in the season for the farmer/gardener, thus giving them a jump start on the growing season.
2. Will allow for indoor growing on a year round basis.
3. Will be in demand, for it would increase productivity.
4. Will require less attention than straight hydroponics.
5. Units are not confined to fresh water, but can be used with salt water as well.
6. Will act as a humidifier, thus adding moisture to the air.
7. Will be educational for children, allowing observation of plant and aquatic life support systems which stimulates their minds on a mechanical level.
8. Can be set up to keep plants watered while on vacation (with water maintainer).
9. Can be a novelty of interest to those who would like a total living system of plants and aquatic animals living together.
10. Could be used as therapy for the elderly, giving them something to do that is new and unique, thereby keeping their minds active.
11. Would add aesthetic value to the home or office.
12. Would be great for the hobbyist or plant enthusiast who would like to create new types of plants by crossbreeding and could see the results much faster.

13. Would save money for the consumer by use of smaller plants at a lower cost which could be grown to the desired size much faster.
14. Would provide a soothing, relaxing environment with the waterfall design.
15. Will be priced in comparison to aquariums now being sold, which would be a price range that most people can afford.
16. Would be unique in its versatility.
17. Could be used on space stations to provide food, revitalize the air and grow large numbers of plants in a small environment with a faster turnover rate.
18. Would be interchangeable four different ways—a combination of all the systems or just one of any combination so as to suitable for all tastes. (Aqua-vibraponics system).
19. Would be an addition to home decor because of several different types of lighting designs which can be used without any other part of the system running and still look attractive.
20. Will give a prism effect with the water in the unit in sunlight or whitelight which would be aesthetically pleasing.

The commercial application of these systems could involve growing plants for aesthetics, as well as for common production of seasonal and non-seasonal plants. There are many homes, apartments, offices, florists, greenhouses, etc. where people are growing plants. The systems of the invention can enhance the aesthetic value of the home, apartment, etc. by increasing the growth in plants, and by making the colors of the plants more distinct. The systems could potentially provide better human nutrition than plants grown in poor soils and provide a large number of plants in a small area all year round. The construction of these systems would be of great significance in that it can be done on a small or large scale bringing jobs to an economy which is depressed.

My invention uses a type vibration which does not use a frequency higher than 500 cycles per second, nor does it incorporate the use of a generator or transducer for therapeutic purposes, and does not use sound waves to stimulate growth. In the invention, there is used a frequency of a lower range, and weights (adjustable) are attached to a vibrating arm that is adjustable so that the proper pitch and energy wave can be achieved in which plants respond very, very well. Also a timer is used to control the stimulus as well using an aeration system (semi-hydroponics) which supplies oxygen, nitrogen and other air nutrients needed by the plants as they grow faster.

The methods and apparatus of the invention will grow a large number of plants, of both agronomic and horticultural varieties, in a small environment with a fast turnover rate. By providing a means to grow plants in places where space is limited, such as homes, apartments and space stations, the invention will increase the economic return from fresh and vine-ripened fruit on a year-round basis, provide jobs for those who harvest the plants (on the commercial market), and also provide jobs for those producing the apparatus used in practicing the invention. The systems of the invention are also beneficial for those who just enjoy growing plants. The invention disclosed herein has application to both agronomic and horticulture varieties, and provides a method of accelerating the growth rate of plants faster than using high frequency vibration and straight hydroponics.

Having thus described the invention in connection with certain preferred embodiments thereof, it will be evident to those skilled in the art that various revisions and modifications can be made to the embodiments described herein without departing from the spirit and scope of the invention. It is my intention, however, that all such revisions and modifications that are obvious to those skilled in the art will be included within the scope of the following claims.

I claim:

1. An apparatus for accelerating the growth rate of plants, said apparatus comprising: a water-tight container, means providing for a layer of water at the bottom of the container, means providing for support of the plants so that the roots of the plants can reach the water layer, and means for applying controlled motion to the plants continuously during predetermined timed intervals, the motion applied to the plants being applied for intervals of 5 to 15 minutes on and 15 to 120 minutes off.

2. The apparatus of claim 1 in which the container has a dead air space at the bottom of the container and a layer of rocks above the dead air space beneath the water level, and air is circulated through the dead air space into the water.

3. The apparatus of claim 1 in which the motion applied to the plants is applied by moving a weighted object back and forth at a predetermined frequency.

4. The apparatus of claim 3 in which the frequency is in the range of 45 to 500 cycles per second.

5. The apparatus of claim 1 in which air is continuously circulated through the water and provided for circulation of the water.

6. The apparatus of claim 1 in which the water is circulated continuously.

7. The apparatus of claim 6 in which air is circulated through the water.

8. The apparatus of claim 6 in which multiple compartments are provided, each independent of the other and the water is circulated from compartment to compartment.

9. The apparatus of claim 8 in which the compartments are at different levels and the water flows from one compartment to the other by force of gravity.

10. A method of accelerating the growth rate of plants comprising the steps of: providing water for the roots of the plants; applying controlled motion to the plants at a frequency in the range of 45 to 500 cycles per second and continuously during intervals of 5 to 15 minutes on and 15 to 120 minutes off.

* * * * *